C. Elveena.
Protecting Animals from Heat.
Nº 58081.  Patented Sept. 18. 1866.
Fig. 5.
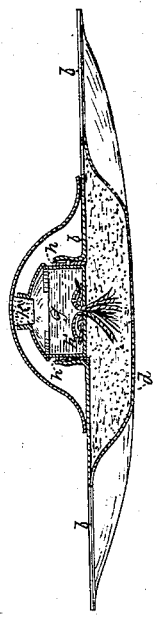
Fig. 3.
Fig. 2.
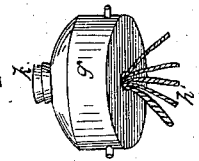
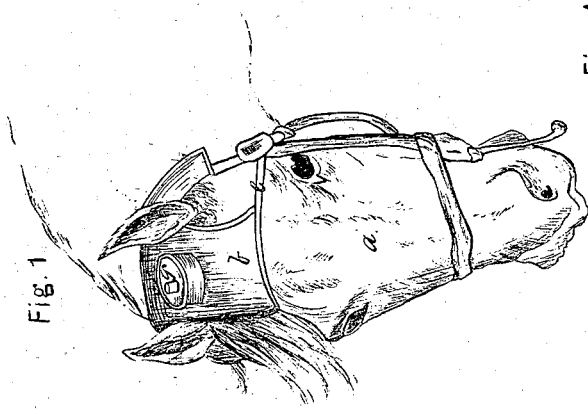
Fig. 1.
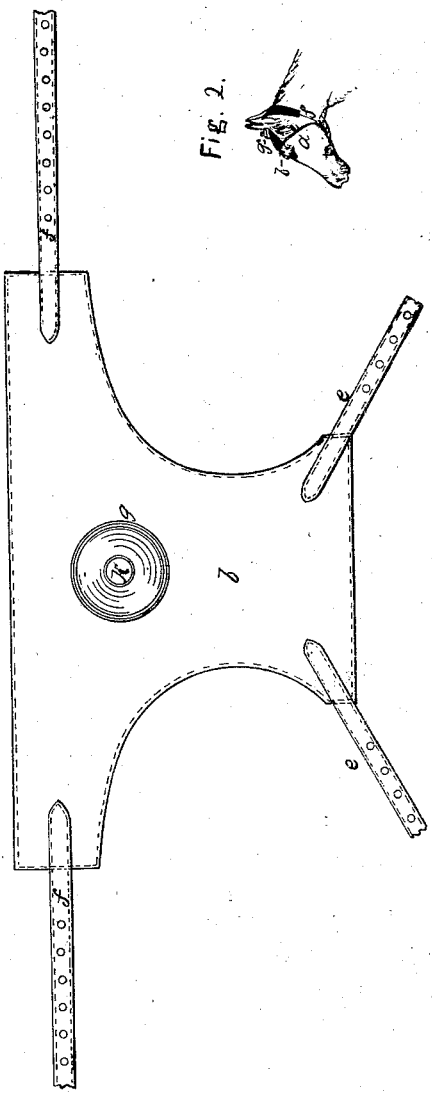
Fig. 4.
Witnesses:
Chas H Smith
Thos Geo Harold
Inventor:
Charles Elveena

UNITED STATES PATENT OFFICE.

CHARLES ELVEENA, OF NEW YORK, N. Y.

IMPROVED MODE OF PROTECTING ANIMALS FROM THE HEAT OF THE SUN.

Specification forming part of Letters Patent No. 58,081, dated September 18, 1866.

*To all whom it may concern:*

Be it known that I, CHARLES ELVEENA, of the city and State of New York, have invented, made, and applied to use a certain new and useful Method of Protecting Animals from the Heat of the Sun; and I do hereby declare the following to be a full, clear, and exact description of the said invention, reference being had to the annexed drawings, making part of this specification, wherein—

Figure 1 is a face view, and Fig. 2 is a side view, of a horse's head with my apparatus applied thereto. Fig. 3 is a section of said apparatus, and Fig. 4 is a plan of the same as opened out flat; and Fig. 5 is a perspective view of the under side of the water-vessel.

Similar marks of reference denote the same parts.

In hot weather, and particularly in the hot sandy plains in portions of the western territories, the sun has a powerful effect on animals, particularly the horse, and finally he is overcome, falls down, and dies. In this manner many valuable animals are yearly sacrificed.

I have discovered practically that this sun-stroke is caused by the action of the heat on the animal's brain, and that if the top of the head is kept moist with water and shielded from the direct rays of the sun the animal can travel in safety in the most oppressive heat.

My invention consists in a double head-shield filled with bran or other light material, that is moistened with water and secured by straps over the animal's skull; and I provide a water-vessel with a capillary wick to keep the contents of the said head-shield constantly moist.

In the drawings, $a$ represents the head of the animal, here shown as a horse. $b$ is the upper, and $c$ the lower, fabric or material composing the head-shield. The edges of $b$ and $c$ are united, so as to form a receptacle for bran or similar material, at $d$.

The head-shield is to be retained in place by suitable straps or by cords passing to the other portions of the harness or around the animal's neck. I have shown the straps $e\ e$ and $f$.

The whole shield may be immersed in water before being used, and will not become dry upon a short journey; but to keep it constantly moist I employ the water-vessel $g$, set into a ring, $h$, upon the top of the shield, and secured by a bayonet-lock; and $h$ is a capillary wick, to cause the water to flow gradually from the vessel $g$ into the bran or other material within the shield.

A cork, $k$, may be employed at the top of the vessel $g$, and to this a flap or cover, $l$, may be attached to keep the sun from shining upon said vessel $g$.

What I claim, and desire to secure by Letters Patent, is—

The method herein specified of protecting animals from the heat of the sun by a shield, constructed substantially in the manner specified.

In witness whereof I have hereunto set my signature this 11th day of August, 1866.

CHARLES ELVEENA.

Witnesses:
CHAS. H. SMITH,
THOS. GEO. HAROLD.